United States Patent [19]

Marks

[11] 3,759,991
[45] Sept. 18, 1973

[54] THIOCARBAMYLATED GUANIDINES - GROWTH REGULANT

[75] Inventor: Alfred F. Marks, Trenton, N.J.

[73] Assignee: Esso Research and Engineering Company, Linden, N.J.

[22] Filed: May 4, 1970

[21] Appl. No.: 34,590

[52] U.S. Cl............... 260/552 R, 71/94, 71/95, 71/99, 71/119, 71/120, 204/158, 252/106, 252/355, 260/293.85, 260/326.83, 260/553 R, 260/553 A, 424/267, 424/274, 424/322
[51] Int. Cl........................................ C07c 127/00
[58] Field of Search................... 260/553 R, 552 R, 260/552 SC, 554

[56] References Cited
OTHER PUBLICATIONS

Geohegan et al., Chemical Abstracts, Vol. 62, Col. 14439 (1965).
Kuselev et al., Chemical Abstracts, Vol. 66, Col. 75768 (1967).

Primary Examiner—Leon Zitver
Assistant Examiner—Michael W. Glynn
Attorney—Chasan and Sinnock and John Paul Corcoran

[57] ABSTRACT

Carbamylated and thiocarbamylated guanidines have demonstrated effective growth regulating activity. Such compounds are represented by the following structure:

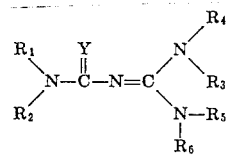

where $R_1$–$R_6$ are each selected from a group consisting of hydrogen, $C_1$–$C_{10}$ alkyl, $C_3$–$C_{10}$ alkenyl, $C_3$–$C_{10}$ cycloalkyl group; phenyl, naphthyl. These groups may be optionally substituted with $C_1$–$C_6$ akyl, chloro or bromo. $R_1$ and $R_2$ and/or $R_3$ and $R_4$ and/or $R_5$ and $R_6$ together can be a carbocyclic ring containing one or more heteroatoms such as N or S; and Y is either O or S.

2 Claims, No Drawings

THIOCARBAMYLATED GUANIDINES - GROWTH REGULANT

BACKGROUND OF THE INVENTION

This invention relates to the use of carbamoylated and thiocarbamylated guanidines as growth regulants.

In one aspect, this invention relates to the use of the aforesaid compounds as fruit thinning agents. In other aspects this invention relates to the use of the aforesaid compounds as plant growth regulants. In yet another aspect, this invention relates to the use of the aforesaid compounds as crop harvest aids. In yet another aspect, this invention relates to the use of the aforesaid compounds as fungicides.

The broad class of growth regulants are those compounds having an ability to regulate vegetative, flowering and fruiting characteristics of crops produced throughout the world. With growth regulators, it is now possible to chemically control and alter the physiological processes in the growing crop, which up until the advent of such technology, could only be triggered by natural and climatic conditions. Thus, it is possible to produce crops of higher quality and with greater flexibility in harvesting procedures. Various theories have been proposed for explaining the mechanisms of chemical growth regulants such as, they prevent fertilization of freshly opened flowers by inducing an incompatible condition between the stylar tissue and the pollen tubes. Another theory is that a crop is thinned because of an increased drop in young fruitlets due to accelerated ethylene generation by the particular treatment. Developing fruitlets on weak spurs with a limited food supply may be more susceptible than those with an abundant supply so that the elimination of clusters where two or more fruits have set on the same spur can be explained on the basis of competition for food, that is, the fruitlets having the greatest advantage for food supply possess the most resistance to the chemical treatment.

Whatever may be the actual mechanism involved in chemical fruit thinning or in the removal of unwanted growth for particular plants, or in the abscission of the fruit when the plant matures thereby regulating the harvest season, the growth regulants have indeed opened up an entirely new field for agricultural chemicals.

An object of the present invention is to provide a process for thinning fruit plants, such as citrus, stone and pome fruits, small fruits and nuts, in which a chemical material may be employed over a relatively wide range of concentrations without danger of over-thinning, as well as causing foliage and fruit damage. Another object of the invention is to provide a process of thinning fruits with a chemical agent which can effectively be applied to the trees over a relatively long period of time beginning with full bloom.

Yet another object of the invention is to provide a process for adjusting the rate and timing of abscission of undesirable late flowers and fruitlets prior to mechanical harvesting of mature crops.

A still further object of the invention is to provide a process for controlling the rate of final development and maturation of crops so as to regulate the timed abscission of the mature fruit, vegetables, nuts or berries.

A still further object of the invention is to provide a process for delaying the onset of normal maturation processes, such as, senescence or defoliation, thereby providing continued vegetative growth, as well as more intensely colored foliage.

Other objects and many of the attendant advantages of this invention will be readily appreciated as the same becomes better understood by reference to the following detailed description.

Briefly, this invention relates to a method for regulating the growth of plants, said method comprising the step of treating growing plants with a material of the group consisting of those compounds represented by one of the following formula:

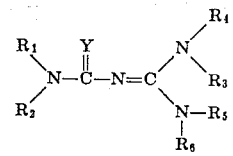

where $R_1$–$R_6$ are each selected from a group consisting of hydrogen, $C_1$–$C_{10}$ alkyl, $C_3$–$C_{10}$ alkenyl, $C_3$–$C_{10}$ cycloalkyl group, phenyl and naphthyl. These groups may be optionally substituted with $C_1$–$C_6$ alkyl, chloro, bromo, $R_1$ and $R_6$ and/or $R_3$ and $R_4$ and/or $R_5$ and $R_6$ together can be a carbocyclic ring containing one or more heteroatoms such as N or S; Y is either O or S.

Specific examples of these compounds are as follows:

1. 1,1,3,3-tetramethyl-2(dimethylthiocarbamoyl) guanidine.
2. 1,1,3,3-tetramethyl-2(dimethylcarbamoyl) guanidine.
3. 1,1-dimethyl-2(N-methyl-N-phenyl thiocarbamoyl)-3,3-diethyl guanidine.
4. 1,1,3-trimethyl-2(di-n-propylthiocarbamoyl)-3(4-chlorophenyl) guanidine.
5. 1-pentamethylene-2(dimethylthiocarbamoyl)-3-methyl-3-methoxy-methyl guanidine.
6. 1,1-diethyl-2(tetramethylenethiocarbamoyl)-3,3-diphenyl guanidine.

The above enumerated compounds can be prepared according to the following procedure which is represented schematically as follows:

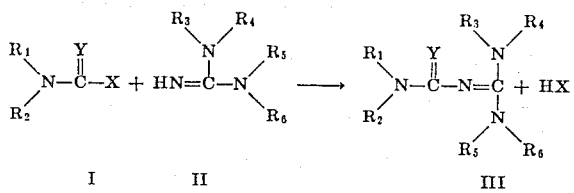

wherein X is chlorine or bromine, $R_1$ – $R_6$ are defined hereunder.

These compounds are prepared by reacting an alkyl thiocarbamoyl chloride or alkylcarbamoyl chloride with tetraalkyl guanidine at a temperature ranging from 0° to 200°C., preferably from 45° to 90°C. at a pressure ranging from 1 to 10 atmospheres, preferably 1 to 2 atmospheres and the reactants are in a concentration of a mole ratio of reactant I to reactant II ranging from 1:0.5 to 1:5, preferably 1:1 to 1:2.

This reaction can be carried out in the presence of xylene, benzene, toluene, acetonitrile, diethylformamide and sulfolane. The preferred solvent is xylene.

As an alternative procedure the 1,1,5,5-tetramethyl-3-dimethylaminodithiobiuret can be subjected to the action of a free radical catalyst which then reduces it to the corresponding tetramethyldimethylthiocarbamoyl guanidine which is represented schematically as follows:

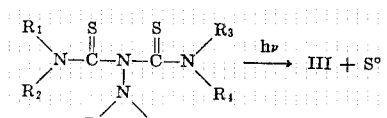

Compounds of the formula

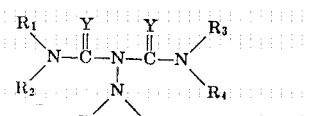

are conveniently prepared in accordance with the disclosure in copending U. S. application Ser. No. 732,858 which was filed May 29, 1968.

Any of the free radical catalytic agents can be used in the practice of this invention. For example, peroxide compounds, organo azo compounds and Actinic radiation such as ultraviolet radiation can be employed as free radical catalytic agents. Representative peroxide compounds which can be used for this purpose include di-tertiary alkyl peroxides such as di-tertiary butyl peroxide and other peroxides such as alkyl hydroperoxides, alkyl peroxy esters, diacyl peroxides, benzoyl peroxide and the like. Suitable azo catalysts which can be used representatively including those having an acyclic azo group, $- N = N -$, bonded to different non-aromatics, i.e., aliphatic or cycloaliphatic carbons, at least one of which is tertiary, e.g., alpha, alpha-azo-diisobutyronitrile, alpha, alpha-azobis(alpha, gamma-dimethyl-valeranitrile), and the like, such as those described in U.S. Pat. Nos. 2,471,959, 2,492,763 and 2,503,253.

The Actinic radiation which can be used as a free radical catalyst in carrying out the method of this invention will generally have a potential energy level in the range of 3.1 to 1 times $10^8$ electron volts. The radiation dose rate will generally be from $10^3$ to $10^7$ roentgens equivalent physical per hour (rep/hour) and the total radiation dosage will generally be from $10^5$ to $10^{11}$ reps, or preferably $10^7$ to $10^9$ reps.

Lower radiation rates can be used but are not practical from a time standpoint since the rate of reaction will be correspondingly slow and higher rates although usable are difficult to obtain and are not necessary in the practice of this invention. The radiation dosages and rates as used herein are internal or actual dosages and the rates received by the reaction system. The unit of roentgen equivalent physical corresponds to an absorption of 93 ergs per gram of material, the material being water, hydrocarbon or rubber which have very nearly the same absorption coefficients. The unit of roentgen equivalent physical is also equal to 5.80 times $10^{13}$ electron volts.

Actinic radiation useful in the practice of this invention include activating rays such as ultraviolet rays having a wave length in the range of 100 to 3,800 angstroms and ionizing rays such as alpha rays, beta rays, gamma rays, X-rays, deuterons, protons and neutrons. The ultraviolet rays can be supplied from lamps or other apparatus which are available for generation of said rays. Sources of radiation include electrical devices such as cathode tubes, which produce electrons and various accelerators, such as cyclotrons, synchrotrons, betatrons, which produce electrons, protons, deuterons and alpha particles. The natural and artificial radio-active elements can also be used as sources of radiation. The radio-active isotopes of radium, thorium, bismuth, palladium, cobalt, phosphorus, strontium and the like can be used as a source of rays. Spent fuel elements can also be used as radiation sources, particularly since they are a low cost source of ionizing radiation. Still another source of ionizing radiation are the highly energetic fragments which result at the moment of fission.

This free radical catalyst reaction described in the alternate preparative procedure can be operated in the absence of a solvent; however, solvents such as cyclohexane, pentane, hexane and water are employable in this reaction. This reaction occurs under a temperature ranging from 0° to 200°C., preferably 20° to 40°C.

The compounds may be applied to the plants any time throughout the growing season, depending on the type of effect desired, in a number of ways. When used, the carbamoylated or thiocarbamylated guanidines are preferably formulated with a suitable inert carrier or diluent thereof.

The term "carrier" or "diluent" as used herein means a material, which can be inorganic or organic and synthetic or of natural origin, with which the active carbamoylated or thiocarbamylated guanidines are mixed or formulated to facilitate its storage, transport, and handling and application to the plants or fungi to be treated. The carrier is preferably biologically and chemically inert and, as used, can be a solid or fluid. When solid carriers are used, they are preferably particulate; however, other shapes and sizes of solid carrier can be employed as well. Such preferable solid carriers can be natural occurring minerals, although subsequently subject to grinding, sieving, purification, and/or other treatments, including for example, gypsum; tripolite diatomaceous earth; mineral silicates such as mica, vermiculite, talc, and pyrophyllite, clays of the montmorillonite, kaolinite, or attapulgite groups; calcium or magnesium limes, or calcite and dolomite, etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575°F., or boiling in the range of about 575°F. to about 1,000°F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 100 percent by weight of the active thiocarbamylated or carbamoylated guanidine ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active thiocarbamylated or carbamoylated guanidine ingredients and a finely powdered solid carrier such as aforedescribed. The powdered carriers can be oil treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the carbamoylated or thiocarbamylated guanidine mixed with a dispersing, i.e., deflocculating or suspending agent, and, if desired, a finely divided solid carrier and/or a wetting agent. The carbamoylated or thiocarbamylated guanidine can be in particulate form or adsorbed on the carrier and preferably constitute at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending properties, as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731" are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

The final wettable powder should preferably have an average particle size of 5-10 microns.

Where the toxicant itself is a liquid, these materials can be sprayed on crops or fungi without further dilution.

Petroleum hydrocarbon fractions used as solvents should preferably have a flash point above 73°F., an example of this being a refined aromatic extract of kerosene. Auxiliary solvents such as alcohols, ketones, and polyalkylene glycol ethers and esters can be used in conjunction with these petroleum solvents.

The treatment rates range from 0.1 to 3 lbs/acre of the active ingredient with a preferred range of 0.1 to one-third lbs/acre. The materials are applied at optimum timing so as to have the desired effect on the particular crop. Therefore, applications may be made once or more than once depending on plant species or varieties, cultural conditions, environmental conditions for the particular type of effect desired.

EXAMPLE 1

Preparation of 1,1,3,3-Tetramethyl-2(Dimethylthiocarbamoyl Guanidine)

This compound was prepared by adding a solution of 0.1 mole tetramethylguanidine dissolved in 20 ml xylene to 0.05 mole dimethylthiocarbamoyl chloride dissolved in 50 ml xylene. This mixture was refluxed for 3 hours, cooled to approximately 30°C. and the tetramethylguanidine hydrochloride salt (7.3 gms) removed by filtration.

The filtrate was cooled in the refrigerator overnight, and the product which precipitated removed by filtration. The initial yield was 3.55 gms of white crystals, m.p. 87°-88°C. The filtrate was concentrated by vacuum at 40°C. to 46 gms and again cooled for a second crop of 2.17 gms, m.p. 86.5°-87.5°C.

Elemental assay of the product is as follows:

|   | Theoretical | Experimental |
|---|---|---|
| C | 47.49 | 47.81 |
| H | 8.97 | 9.16 |
| N | 27.70 | 27.52 |
| S | 15.85 | 15.99 |

This structure also confirmed by NMR and Mass Spectrometry.

EXAMPLE 2

0.1 gram of a 1 percent suspension of 1,1,3,3-tetramethyl-2(dimethylthiocarbamoyl) guanidine in lanolin was placed around the lower stem of each of the two Deltapine cotton plants. In the case of bean seedlings the 0.1 g of the same formulation was applied to the growing points of the plants.

The abscission of the previously debladed lowest petiole on each plant was determined seven days following treatment by application of a 5 gr. pressure to the outer portion of the petiole. The treated plants exhibited accelerated petiole abscission as shown by the following data for each replica.

TABLE I

| Compound Treatment - Lanolin | Days to Cotton Petiole Abscission | 7 Day Growth Regulant Effect on Bean Seedlings |
|---|---|---|
| Only - Control | 6 | No effect |
| 1,1,3,3-Tetramethyl-2 (dimethylthiocarbamoyl) guanidine | 2 | New growth abscissed |

EXAMPLE 3

Fungicide Test

In order to demonstrate the fungicidal activity of these compounds of the subject invention, aqueous solutions of the active compounds were prepared by mixing the active ingregredients with varying amounts of acetone as an auxiliary solvent, adding thereto 100 parts per million by weight of a commercial wetting agent consisting of Triton X 100 and diluting this premixture with water to the desired concentration indicated in the Table hereinbelow. Triton X 100 is one of a line of commercial surfactants produced by Rohm & Haas Company and is a liquid alkyl aryl polyether alcohol that is an acid stable detergent and is nonionic in character as an emulsifier. It is prepared by reaction of an alkylphenol with ethylene oxide.

The spray solution containing the active fungicide was applied as a protectant spray to tomato plants. After the deposit had dried, Phytophthora Infestans spores were applied. Disease ratings were taken in 7–10 days. The results are shown in Table II.

TABLE II

FUNGICIDAL ACTIVITY

Late Blight Control of Thiocarbamylated Guanidines

| Compound | PPM | Late | Blight |
|---|---|---|---|
| 1,1,3,3-Tetramethyl-2 (dimethylthiocarbamoyl) guanidine | 2000 | 10 | 8 |
|  | 1000 | 8 | 5 |
|  | 500 | 5 | 5 |
| Control | - | 0 | 0 |

10=100% disease control; 0=0% disease control.

What is claimed is:

1. A compound of the formula

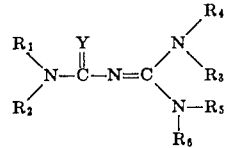

Wherein $R_1$–$R_6$ are independently $C_1$–$C_{10}$ alkyl and Y is sulfur.

2. A compound according to claim 1, 1,1,3,3-tetramethyl-2(demethylthiocarbamoyl) guanidine.

* * * * *